US006293685B1

(12) United States Patent
Polkow

(10) Patent No.: US 6,293,685 B1
(45) Date of Patent: Sep. 25, 2001

(54) MARKER LIGHT ASSEMBLY

(75) Inventor: Jon C. Polkow, Monument, CO (US)

(73) Assignee: Innovative Scuba Concepts, Inc., Colorado Springs, CO (US)

(*) Notice: Subject to any disclaimer, the term of this patent is extended or adjusted under 35 U.S.C. 154(b) by 0 days.

(21) Appl. No.: 09/465,060

(22) Filed: Dec. 16, 1999

Related U.S. Application Data

(62) Division of application No. 09/057,955, filed on Apr. 9, 1998, now Pat. No. 6,019,480.

(51) Int. Cl.[7] ............................ G01D 11/28; F21V 33/00

(52) U.S. Cl. .............................. 362/253; 362/23; 362/96; 116/286; 222/113

(58) Field of Search ................................ 362/96, 23, 253, 362/29, 100, 381, 399; 222/113; 116/284, 286, DIG. 36

(56) References Cited

U.S. PATENT DOCUMENTS

| | | | | |
|---|---|---|---|---|
| 1,985,483 | * | 12/1934 | Clarke | 362/100 |
| 4,583,151 | * | 4/1986 | Nagel | 362/29 |
| 5,291,378 | * | 3/1994 | Stone | 362/96 |
| 5,491,617 | * | 2/1996 | Currie | 362/96 |
| 5,611,613 | * | 3/1997 | Bergen et al. | 362/100 |
| 5,664,860 | * | 9/1997 | Berardi | 362/29 |

* cited by examiner

*Primary Examiner*—Thomas M. Sember
(74) *Attorney, Agent, or Firm*—Richard W. Hanes

(57) ABSTRACT

A light emitting grip comprising, a manually operable rotatable knob mounted on a fastening shank projecting from a first side thereof and having a selectively switchable light source carried by the knob.

4 Claims, 3 Drawing Sheets

Fig. 3
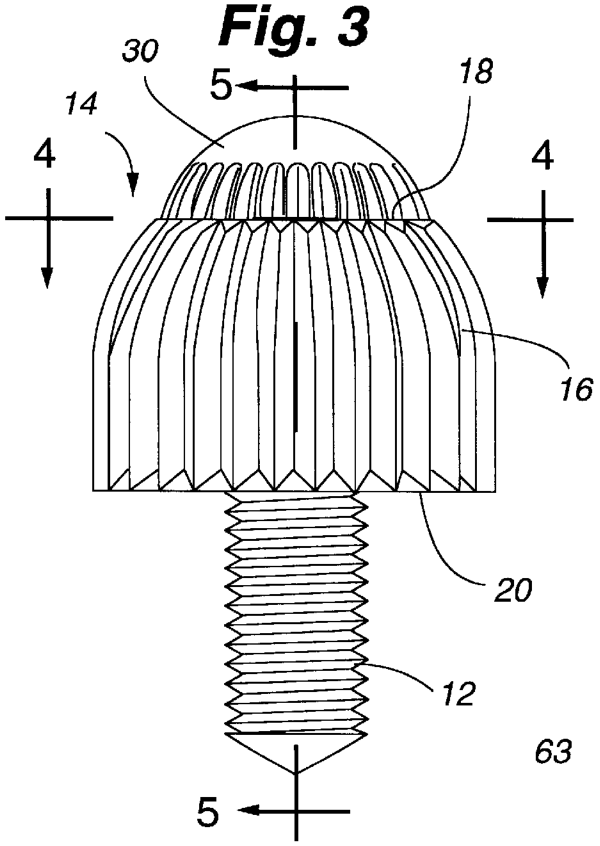
Fig. 8
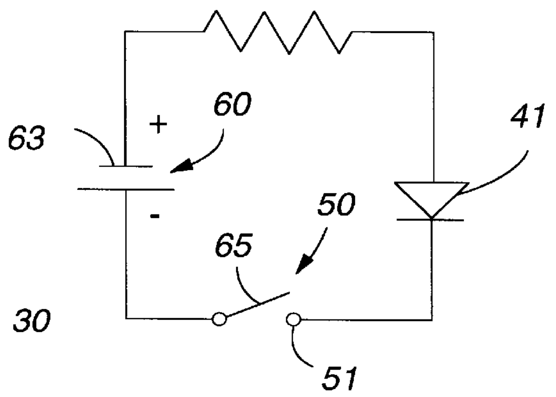
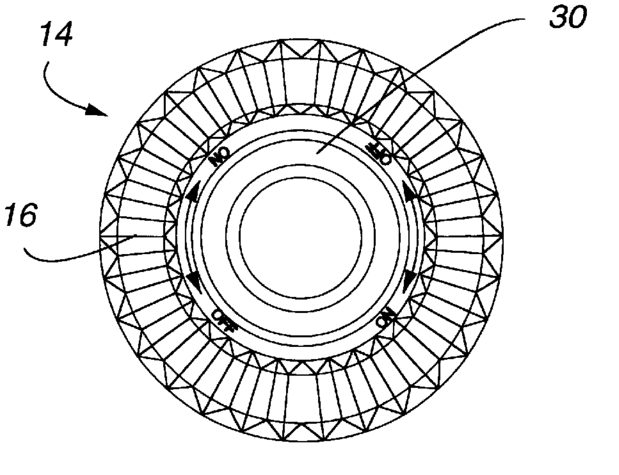
Fig. 4

Fig. 5
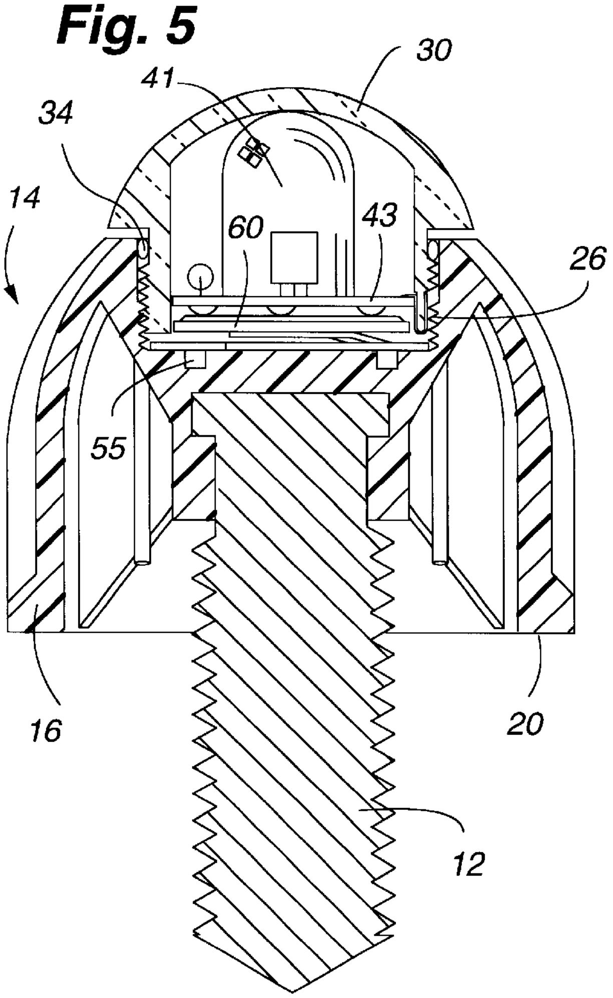
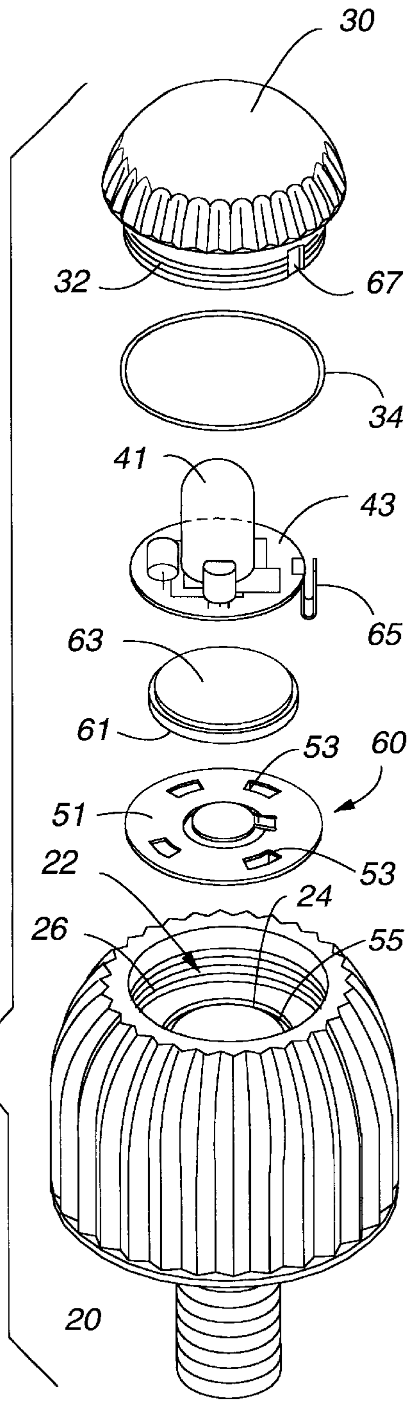
Fig. 6
Fig. 7
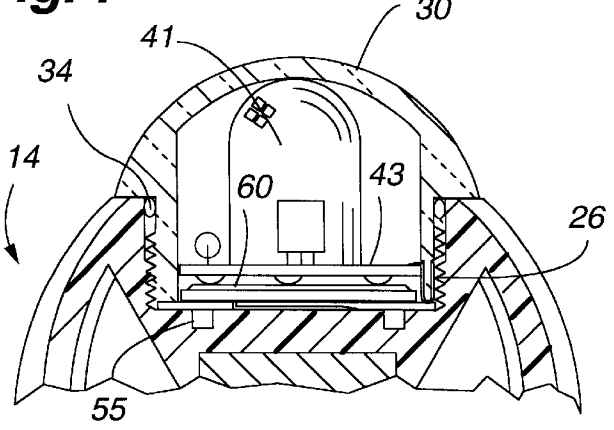

MARKER LIGHT ASSEMBLY

The following is a divisional application of U.S. Ser. No. 09/057,955, filed Apr. 9, 1998 now U.S. Pat. No. 6,019,480.

The present invention relates to an assembly for mounting a marker light in an operative rotatable grip or knob.

BACKGROUND

Lights for marking routes, obstacles and hazards are well known in several different formats such as surmounting emergency vehicles, roadway barriers and defining theater and aircraft aisles, to mention only a few.

In addition to the foregoing, however, there is need for marking and identifying people and objects that frequently are or may be obscured, or partially so, by their immediate environment. Primary examples of people in the particular category include scuba divers that are diving or working together in water having poor visibility or at night. Firemen who are working in smoke filled areas constitute another class of individuals that would benefit from being able to quickly spot the location of other individuals in a working group by means of an easy to see marker light. Door knobs that are quickly perceptible in dark or smoke obscured areas would be a definite safety benefit. Scuba divers, fireman and others that utilize air or oxygen breathing equipment all employ gas pressure regulators that perform with turning knobs and grips, similar in function to the operative knobs or handles on building doors.

Accordingly, it is the primary object of the present invention to provide a marker light assembly for rotatable knobs grips and handles in order for one to easily and quickly recognize the location of the person or thing carrying the knob or grip as part of their or its equipment or accouterment.

Another object of the invention is to provide a light source for rotatable operating grips, including the power source, the circuitry, the illuminating device and a switch, or other device, with which to turn the light on and off.

Other and further objects, features and advantages of the present invention will become apparent upon a reading of the following description of the preferred form of the invention, together with suggestions and descriptions of alternative embodiments.

DESCRIPTION OF THE DRAWINGS

FIG. 3 is a side view of the yoke screw of the present invention, including the manually operable knob, or grip, that is used to turn the screw.

FIG. 4 is a top view of the knob of the yoke screw.

FIG. 5 is a cross sectional view taken along lines 5—5 of FIG. 3

FIG. 6 is a perspective exploded view of the yoke screw knob of the present invention and the various components of the lighting source that is disposed in a recess in the top of the knob.

FIG. 7 is a typical circuit diagram of the lighting source, including the battery and the switch.

DESCRIPTION OF A PREFERRED EMBODIMENT

Although the invention can take different forms, the preferred form of the invention is characterized as a yoke screw knob light (yoke light) on the first stage of an air regulator, such as those used by scuba divers.

Figure 1:
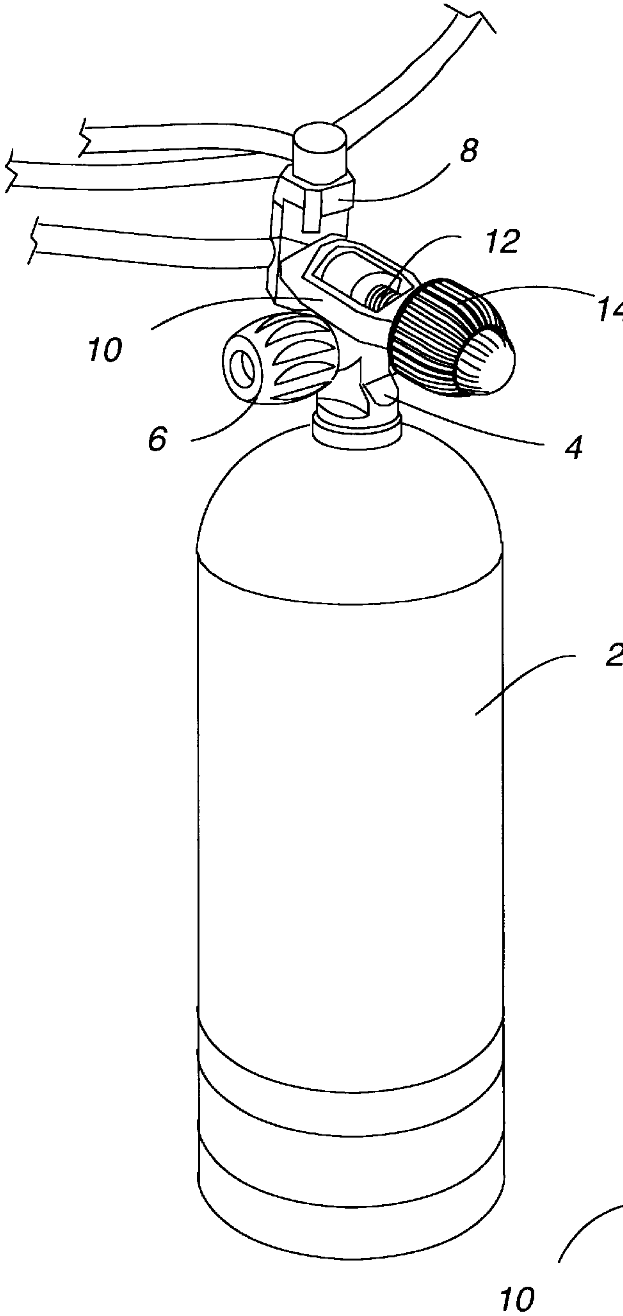
FIG. 1 is a perspective view of a typical air tank to which is connected the first stage of the pressure regulator. Shown fragmentarily are the various hoses which lead from the first stage to various end devices, such as the second stage of one or more pressure regulators used for breathing, an air supply indicator and others.
Figure 2:
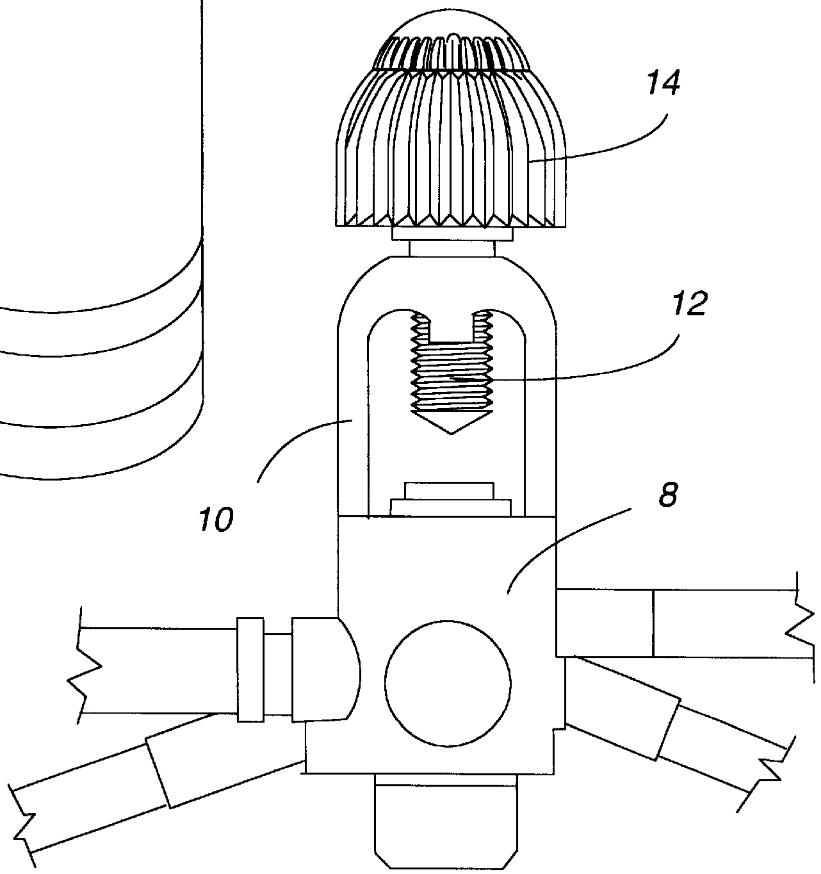
FIG. 2 is a top plan view of the attachment yoke of the first stage regulator, showing the air hoses fragmentarily and showing the yoke screw which attaches the regulator's first stage to the tank valve.

Referring to FIGS. 1 and 2, a tank 2 for holding breathing air under pressure is shown. A valve 4, having a valve handle 6, projects from the top of the tank. The first stage 8 of the air pressure regulator is attached to the tank valve 4 with a yoke 10 that fastens the first stage to the valve's air outlet. The port for transferring the air from the valve outlet to the regulator first stage is a bore through the aft end of the yoke 10 (not shown). A threaded fastening shank 12 with a turning knob 14 is carried through the opposite end of the yoke. To attach the yoke to the valve the yoke screw 12 is turned with the knob 14 until the top of the valve 4 is held tightly between the end of the screw and the aft end of the yoke.

The yoke screw knob 14 serves as an advantageous location for a diver's marker light, to indicate the position of the diver to other divers. Such a light is especially useful during night diving operations or in water having limited visibility.

The yoke screw knob 14 is preferably made of plastic or metal. The knob comprises a body 16 of substantially hemispherical shape, although other convenient shapes for gripping and turning are also perfectly acceptable. The outer surface of the knob is knurled, ridged or shaped for easy gripping. The inside of the knob is constructed so as to anchor one end of the threaded shank screw 12. In the preferred form of the invention, the body 16 of the knob is truncated, forming a flat plane section 18 that is parallel with the equatorial base 20 of the body. A central circular cavity 22 is recessed from the plane section 18, as shown best in FIG. 6. The cavity, or recess, 22 contains a flat bottom surface 24 and sidewalls 26 that are threaded.

A translucent dome shaped lens 30 having a depending circular neck 32 that is threaded on the distal end of its outside surface is sized and adapted to be screwed into the threaded sidewalls 26 of the recess 22 in the knob 14 so as to mount the lens over the recess on the plane surface of the truncated knob. An O-ring 34 surrounds the upper, or proximal, portion of the depending lens neck 32 to provide a water tight seal between the body of the knob and the lens neck, keeping the interior of the cavity 22 free from water.

Mounted inside the recess 22 is a light source. Generally, the lighting source comprises a power source, electrical circuitry, an illumination device and a switch for turning the light on or off. As seen in FIGS. 5 and 6, illumination is provided by a light emitting diode (LED) 41 that is secured to the top side of a circular printed circuit board 43. Several different configurations of electrical circuits that interconnect the components of the light source are possible, depending upon the desired end result. For example, the LED can be made to flash intermittently or flash a code, such as SOS, when it is turned on. Alternatively, it can be made to stay illuminated constantly until it is turned off. The circuitry to accomplish either of these ends is well known and does not form a part of this invention except for the construction of the switch and its method of operation, as will be now explained.

The first contact of the switch 50 comprises a circular metal plate 51 that is seated on the bottom of the recess 22.

In order to at least partially secure the plate into the recess, the plate is provided with a plurality of punched out ears 53 that are press fitted into a circular channel 55 in the bottom of the recess. A coin cell type of battery 60, having the top and bottom surfaces thereof 61 and 63 as its respective terminals, rests flat against the upper surface of the circular plate 51, making electrical contact therewith. The battery is of smaller diameter than the plate 51, leaving an annular outer ring portion of the upper plate surface uncovered by the battery 60.

The upper terminal surface 63 of the battery 60 faces the underside of the printed circuit board when the components are assembled. Therefor, when the circuit board is depressed downwardly by the screwing down of the lens 30, one or more electrical contacts on the underside of the circuit board will contact the terminal surface 63 of the battery, thus bring the electrical power source into the circuit.

The circular shaped circuit board 43 is press fitted into the inside of the neck 32 of the lens 30. In addition to the support provided by the press fit, the circuit board is provided with a depending springable metal finger 65, one end of which is mechanically connected to the board 43. The other end of the finger is bent over into a hook configuration so as to be capable of mechanical connection to the neck of the lens. The finger 65 is also electrically connected into the circuitry on the circuit board, as shown in FIG. 7. The hook acts in two capacities. It first serves as a mechanical connection to assist in securing the circuit board to the neck 32 of the lens. It does so by the bent over end hooking over the bottom edge of the neck and tucking into a small longitudinal channel 67 recessed below the level of the threads on the exterior surface of the neck. By the hook's disposition in the recessed channel, it does not interfere with the smooth engagement between the neck threads and the threads of the cavity sidewalls 26 when the lens is being screwed into the cavity. The second function performed by the metal finger 65 is to act as the second contact of the switch 50 that turns the illuminating source 41 on and off. The end of the bent finger 65 that snaps over the bottom edge of the lens neck is positioned to come into contact with the exposed annular outer ring of the plate 51 when the lens neck travels downwardly by the manual act of screwing the lens 30 into the cavity 22. Such contact effectuates a closure of the switch 50, which enables the circuit and turns on the LED, either as a constant source of light, or as an intermittent light, depending on the make-up of the circuit. By unscrewing the lens a small amount, the lens and the attached hook are elevated away from contact with the switch plate 51 and the circuit is broken or disabled, turning off the LED.

After the lens is substantially seated within the cavity, further rotation of the lens in its threaded engagement with the sidewalls of the cavity will cause the finger 65 to make contact with the switch plate 51, as previously described. However, in making such contact the battery is sandwiched between the bottom contacts of the circuit board 43 and the switch plate 51. The operation of the switch formed by the finger 65 and the plate 51 presents a better feel to the operator of the lens if the sandwich is somewhat compressible. To implement this feature the center of the switch plate 43 is cut out in an annular pattern that is not a complete circle, but leaves a small tab 57 that interconnects the body of the plate to the center section 59 of the switch plate. By slightly permanently deforming the center section 59 upwardly above the level of the rest of the plate before the battery is placed on the plate, a springable support for the battery is formed. As the battery is depressed by the turning of the lens and the consequent downward pressure of the circuit board against the top surface 63 of the battery, the supporting center section 59 of the plate 51 moves the tab 57 elastically downwardly, providing a spring bias upwardly against the battery. When the pressure on the battery is released by turning the lens in the opposite direction from that of seating the battery downwardly, the center section elastically raises.

While an LED and an associated circuit have been described, different kinds of light sources can be utilized, such as incandescent or fluorescent lights. It is also within the scope of the invention to utilize chemical lights disposed within the recess of the knob or mounted elsewhere on the knob or grip, subject only to access to initiate the light producing chemical reaction.

I claim:

1. A light emitting grip comprising, a manually operable rotatable gripping base mounted on a fastening shank projecting from a first side thereof, a recess disposed in a second side of the base opposed to the first side thereof, a selectively switchable light source disposed within the recess, and a translucent lens carried by the base and covering the recess, and wherein the light source comprises,

- a power source,
- an illumination means,
- a switch selectively interconnecting the power source and the illumination means, said switch comprising,
  - a first contact comprising an electrically conductive plate disposed in the recess, and
  - a second contact comprising an electrically conductive finger carried by the lens.

2. The combination of claim 1 wherein the illumination means is carried on a printed circuit board having electrical contacts and disposed in the recess, whereby the finger is electrically connected to at least one of the contacts on the circuit board.

3. A light emitting handle comprising, a body having a base and a dome shaped gripping surface extending around the base, a shank attached to the base and defining a longitudinal axis about which the body is rotatable, a cylindrical recess disposed in the gripping surface symmetrically about an extension of the longitudinal axis through the dome shaped gripping surface, a light source disposed within the recess and including,

- a power source,
- illumination means,
- a switch selectively interconnecting the power source and the illumination means, said switch comprising,
  - a first contact comprising an electrically conductive plate disposed in the recess, and
  - a second contact comprising an electrically conductive finger carried by the lens.

4. The combination of claim 3 wherein the illumination means is carried on a printed circuit board having electrical contacts and disposed in the recess, whereby the finger is electrically connected to at least one of the contacts on the circuit board.

* * * * *